US010585005B2

(12) United States Patent
Bodley

(10) Patent No.: US 10,585,005 B2
(45) Date of Patent: Mar. 10, 2020

(54) TEMPERATURE SENSITIVE INDICIA FOR DANGEROUS GOODS

(71) Applicant: MTI GROUP PTY LTD, Wangara (AU)

(72) Inventor: Nicholas Grant Bodley, Wangara (AU)

(73) Assignee: MTI GROUP PTY LTD, Scone, New South Wales (AU)

( * ) Notice: Subject to any disclaimer, the term of this patent is extended or adjusted under 35 U.S.C. 154(b) by 0 days.

(21) Appl. No.: 14/651,006

(22) PCT Filed: Dec. 10, 2013

(86) PCT No.: PCT/AU2013/001442
§ 371 (c)(1),
(2) Date: Jun. 10, 2015

(87) PCT Pub. No.: WO2014/089616
PCT Pub. Date: Jun. 19, 2014

(65) Prior Publication Data
US 2015/0330843 A1    Nov. 19, 2015

(30) Foreign Application Priority Data

Dec. 10, 2012 (AU) ............................. 2012905375

(51) Int. Cl.
*G01K 11/12* (2006.01)
*G01K 11/16* (2006.01)
(52) U.S. Cl.
CPC ............ *G01K 11/12* (2013.01); *G01K 11/165* (2013.01)
(58) Field of Classification Search
CPC ..................... G01K 11/12; G01K 11/165
(Continued)

(56) References Cited

U.S. PATENT DOCUMENTS 2,308,087 A * 1/1943 Lappala ................. G01K 11/12
116/207
2,892,798 A    6/1959 Dobbs et al.
(Continued)

FOREIGN PATENT DOCUMENTS

AU    WO2013188906 A * 8/2012 ............. E21B 33/12
WO    2011/125837 A1    10/2011

OTHER PUBLICATIONS

Derwent Abstract: AU 2009100556 A4, N G Bodley, "Inflatable borehole plug has coatings having high visibility property and high, infrared and/or heat reflective properties, formed in external cover, so that pressureized aerosol can is located within lower portion of cover", Abstract.*

(Continued)

*Primary Examiner* — Nimeshkumar D Patel
*Assistant Examiner* — Tania Courson
(74) *Attorney, Agent, or Firm* — Collard & Roe, P.C.

(57) ABSTRACT

An indicator comprises a first portion having a first temperature sensitive indicia arranged so as to provide an ongoing visible indication that the aerosol can has reached a predetermined temperature and a second temperature sensitive indicia arranged so as to provide a visible indication when the aerosol reaches a different predetermined temperature. There is also a dangerous item that comprises a temperature sensitive indicia arranged on the item so as to provide a visible indication when the item reaches a predetermined temperature.

13 Claims, 2 Drawing Sheets

(58) Field of Classification Search
USPC ......... 116/201, 207, 216; 374/150, 161, 162
See application file for complete search history.

(56) References Cited

U.S. PATENT DOCUMENTS

| | | | | |
|---|---|---|---|---|
| 3,067,057 | A * | 12/1962 | Dabroski | C09J 7/046 116/DIG. 14 |
| 4,038,873 | A * | 8/1977 | Kimmel | G01K 3/04 116/206 |
| 4,459,046 | A * | 7/1984 | Spirg | G01K 1/14 116/207 |
| 4,538,926 | A * | 9/1985 | Chretien | G01K 1/143 374/150 |
| 4,664,056 | A | 5/1987 | Jehanno | |
| 4,846,278 | A * | 7/1989 | Robbins | B01J 7/02 166/286 |
| 5,323,652 | A * | 6/1994 | Parker | G01F 23/22 73/295 |
| 5,346,005 | A * | 9/1994 | Robbins | E21B 33/127 166/187 |
| 6,126,313 | A * | 10/2000 | Schiller | G01K 11/165 374/142 |
| 6,244,208 | B1 * | 6/2001 | Qiu | G01K 3/04 116/207 |
| 6,585,411 | B2 * | 7/2003 | Hammarth | G01K 1/14 374/150 |
| 6,694,912 | B2 * | 2/2004 | Wesley | G01K 11/12 116/207 |
| 6,719,210 | B2 * | 4/2004 | Clarke | G01F 23/22 116/207 |
| 6,957,623 | B2 | 10/2005 | Guisinger | |
| 7,028,634 | B1 * | 4/2006 | Lee | F21L 14/00 116/207 |
| 7,302,846 | B2 * | 12/2007 | Hadala | G01F 23/22 73/290 R |
| 7,514,262 | B2 * | 4/2009 | Ribi | G01N 31/229 116/206 |
| 7,963,694 | B2 * | 6/2011 | Leute | G01K 3/005 374/157 |
| 8,187,892 | B2 * | 5/2012 | Ribi | C09B 57/10 436/166 |
| 8,269,597 | B2 * | 9/2012 | Darr | H01H 85/30 116/206 |
| 9,145,514 | B2 * | 9/2015 | Shirase | C09K 9/02 |
| 9,243,878 | B2 * | 1/2016 | Martin | E21B 33/1277 |
| 2003/0056587 | A1 * | 3/2003 | Carpenter | G01F 23/22 73/290 R |
| 2003/0086474 | A1 | 5/2003 | Hammarth et al. | |
| 2006/0032427 | A1 * | 2/2006 | Ishii | B65D 79/02 116/217 |
| 2010/0012017 | A1 * | 1/2010 | Miller | A61B 5/015 116/201 |
| 2010/0012018 | A1 * | 1/2010 | Ribi | C09B 57/10 116/207 |
| 2012/0055393 | A1 * | 3/2012 | Wang | G01K 11/12 116/207 |
| 2013/0014690 | A1 | 1/2013 | Shirase | |

OTHER PUBLICATIONS

International Search Report of PCT/AU2013/001442, dated Apr. 11, 2014.

* cited by examiner

TEMPERATURE SENSITIVE INDICIA FOR DANGEROUS GOODS

CROSS REFERENCE TO RELATED APPLICATIONS

This application is the National Stage of PCT/AU2013/001442 filed on Dec. 10, 2013, which claims priority under 35 U.S.C. § 119 of Australian Application No. 2012905375 filed on Dec. 10, 2012, the disclosures of which are incorporated by reference.

FIELD OF THE INVENTION

The present invention relates to dangerous goods that can become more dangerous or unsafe when exposed to extreme temperatures and indicia for indicating when this has occurred.

BACKGROUND

Typically an explosive charge for mining and other excavation activities is placed in a borehole. Frequently the charge is supported at a point below the surface, that is, it is supported at a desired depth in the borehole by an inflatable plug in the form of gas tight bag. The plug is lowered to a desired depth and inflated such that it becomes firmly engaged with the sides of the borehole. Typically an aerosol canister is used to inflate the bag, with the aerosol being locked on to inflate the bag when it is in position in the borehole.

The storage and use of aerosol canisters is subject to international and local standards relating to safety where the canister is classified as safe when not exposed to direct sunlight or temperature above 50 degree C. When exposed to temperatures above 50 degrees the canister can become stressed and good safety protocols will deem such a canister unsafe. In extreme conditions, such as temperatures above 70 degrees, the canister can explode.

At present personnel using such inflatable plugs have no ready means of determining the temperature of the canister, nor whether the canister has been exposed to dangerous temperatures. Similar problems exist for other dangerous goods for which an exposure to a temperature extreme can render them more dangerous or unsafe.

The present invention seeks to provide a solution to this problem.

Reference to prior art documents is not an admission that they form part of the common general knowledge of a skilled person in any jurisdiction.

SUMMARY OF THE PRESENT INVENTION

According to one aspect of the present invention there is provided an inflatable plug comprising:
a bag portion; an inflation means; and a temperature sensitive indicia arranged to provide a visible indication when the inflation means reaches a predetermined temperature.

In an embodiment the temperature sensitive indicia provides a permanent visible indication.

In an embodiment the inflatable plug further comprises a second temperature sensitive indicia arranged to provide a visible indication when the inflation means reaches a second predetermined temperature. In one embodiment the second predetermined temperature is lower than the first predetermined temperature. In a preferred embodiment the second predetermined temperature is more than the first predetermined temperature.

In an embodiment the second temperature sensitive indicia provides a reversible change in the visible indication.

In an embodiment the temperature sensitive indicia is a printed thermochromic ink.

According to one aspect of the present invention there is provided an inflatable plug comprising:
a bag portion; an inflation means; and a temperature sensitive indicia arranged to provide an ongoing visible indication that the inflation means reached a predetermined temperature.

According to one aspect of the present invention there is provided a dangerous item comprising:
a temperature sensitive indicia arranged on the item so as to provide a visible indication when the item reaches a predetermined temperature.

According to one aspect of the present invention there is provided a dangerous item comprising:
a temperature sensitive indicia arranged on the item so as to provide an ongoing visible indication that the item can has reached a predetermined temperature.

According to one aspect of the present invention there is provided a method of indicating when a dangerous item reaches a predetermined temperature comprising:
providing a temperature sensitive indicia on the item arranged to provide a visible indication when the item reaches the predetermined temperature.

According to one aspect of the present invention there is provided a method of indicating that a dangerous item reached a predetermined temperature comprising:
providing a temperature sensitive indicia on the item arranged to provide an ongoing visible indication that the item reached the predetermined temperature.

According to one aspect of the present invention there is provided an indicator comprising a first portion having a first temperature sensitive indicia arranged so as to provide an ongoing visible indication that the aerosol can has reached a predetermined temperature and a second temperature sensitive indicia arranged so as to provide a visible indication when the aerosol reaches a different predetermined temperature.

In this specification the terms "comprising" or "comprises" are used inclusively and not exclusively or exhaustively.

DESCRIPTION OF DRAWINGS

In order to provide a better understanding of the present invention preferred embodiments will now be described, by way of example only, with reference to the accompanying drawings, in which:

FIGS. 2A, 2B and 2C are enlarged views showing a plurality of stages of visible indication of temperature rises.

DESCRIPTION OF EMBODIMENTS OF THE INVENTION

Figure 1:
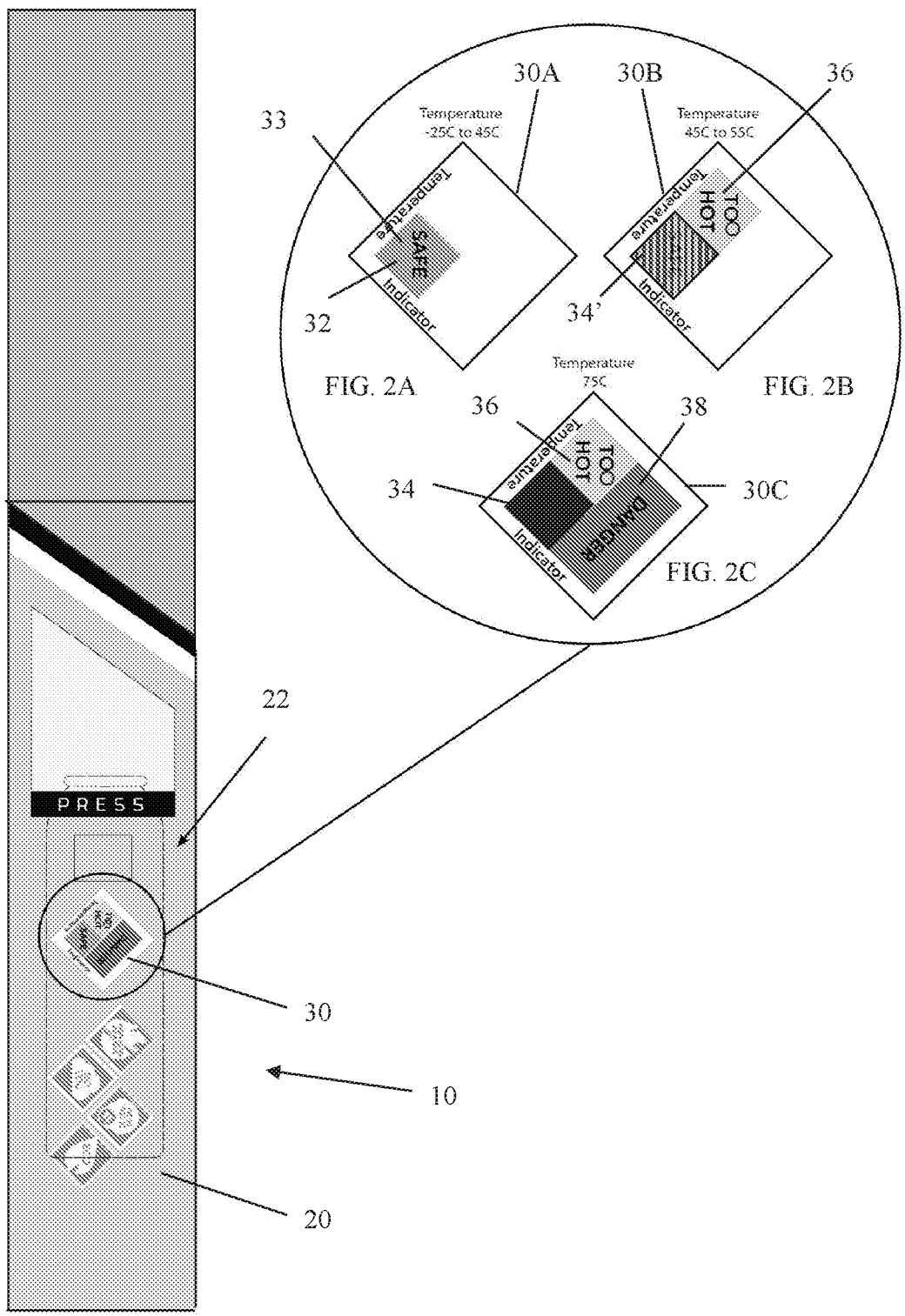
FIG. 1 is a side elevation of an embodiment of an inflatable plug according to the present invention.

Referring to FIG. 1 there is shown an inflatable plug 10 comprising a bag portion 20 made from for example woven polypropylene; an inflation means, for example an aerosol canister 22. The bag portion and canister may be of the form described in Australian Innovation Patent 2009100556, the contents of which as incorporate herein by reference, although it will be appreciated that other forms are possible. The plug 10 further comprises one or more temperature sensitive indicia 30 arranged to provide a visible indication when the inflation means 22 reaches a first predetermined temperature. The indicia 30 can also be provided on the canister 22, such that the indicia 30 is visible from outside of the plug 10, for example through a translucent or transparent window in the plug 10.

Referring to FIG. 2A a part of the indicia 30 indicates that a temperature of the canister 22 is below a first predetermined temperature, such as below 45 degrees C. In this embodiment a square 32 with a green background is used with the word "SAFE" appearing within the square. This indicates that the canister 22 is below 45 degrees and at a safe temperature.

Referring to FIG. 2B another part of the indicia 30 indicates a temperature above the first predetermined temperature. This temperature may be selected, as described below, to be for example within the range 45 to 55 degrees C. In this embodiment a visual indicia 36 in the form of a yellow square with the words "TOO HOT" will become visible. In an alternative embodiment, or in addition, the green "SAFE" square 32 may change to a form 34 such as to remove the word "SAFE" or for block out the square such as to turn it black. This indicates that the canister is above (for example) 50 degrees and the plug is no longer at a safe temperature.

In an embodiment the change from square 32 to square 34 is permanent, such that the change cannot be reversed. This means that once the plug has been exposed to high temperature is will be deemed unsafe. Alternatively, or in addition, indicia 36 becoming visible is permanent.

In another embodiment the change from square 32 to square 34 may be delayed or be slow to transition (such as from 32 to 34' in FIG. 2B and then to 34 in FIG. 2C), and this may take for example an hour. It is preferred that the delay be long enough for the plug be moved to a cooler place or otherwise be cooled, but short enough in time that the canister will not have been exposed to the high temperature for a prolonged period of time. In an embodiment the change from square 32 to square 34 is progressive and permanent, such that the change can not be reversed. This means that once the plug has been exposed to enough stress due to the high temperature for long enough is will be deemed unsafe.

Referring to FIG. 2C a further part of the indicia 30 indicates a temperature above a second predetermined temperature, such as within the range 70 to 75 degrees C. In this embodiment a visual indicia 38 in the form of a red square with the words "DANGER" will become visible. In an embodiment the green "SAFE" square 32 has changed to a form 36 such as the word "SAFE" is blacked out. This indicates that the canister is above (for example) 70 degrees and not only is the plug is no longer at a safe temperature for use, it may explode and emergency measures may need to be taken, such as for example evacuation and/or treatment as though an explosion is imminent.

In an embodiment the change to make square 38 visible is permanent, such that the change cannot be reversed. However it is preferred that the change to indicia 38 be reversible so that once cooled it can be deemed unsafe, but not treated as though it is about to explode.

Indicia 30 are preferably formed of thermochromic ink printed on to or affixed within a capsule or sticker on to the bag 20 in the vicinity of and preferably covering the canister 22, or directly on the canister 22. Such thermochromic inks are commercially available in products such as a Tempilabel™ irreversible temperature indicating label, which produce a permanent colour change. Leucodye microcapsules can produce a desired colour change at a desired temperature, that is reversible. Liquid crystal can change colour at a desired temperature or blackout and are commonly used in thermometers. The specific characteristics of the thermochromic ink can be selected according to the temperature that the colour change is desired to occur at.

To achieve the embodiment described above square 32 may be printed in normal ink and a thermochromic ink that is transparent at lower temperatures, but blackens at 50 degrees, can be printed over the top. Alternatively the black square may be printed in black and a green thermochromic ink printed over the top with the lettering omitted and such that the thermochromic ink turns black (or transparent) at 45 degrees. The ink used in Series 21 Tempilable 120F may be suitable for this. If the change is intended to be gradual the thermochromic ink may include a change inhibitor 33 of the indicator square that slows the colour change.

To achieve the embodiment described above for square 36 thermochromic ink that is normally transparent can be printed, but the ink changes colour at 50 degrees. The ink used in Series 21 Tempilable 120F may be suitable for this.

To achieve the embodiment described above for square 38 thermochromic ink that is normally transparent can be printed, but the ink changes colour at 75 degrees. The ink used in Series 21 Tempilable 170F may be suitable for this.

The thermochromic ink may be directly printed on the bag portion 20, or it may be printed on a sticker which is in turn stuck to the bag portion 20 over the canister 22.

In use when an inflatable plug is exposed to high temperatures, such as direct exposure to sunlight, the temperature sensitive indicia on the plug will provide a visible indication when the inflation means reaches the predetermined temperature, such as when the canister is exposed to too high a temperature. When the colour change is permanent, even if the temperature has later dropped and is now at a safe level there is an ongoing visible indication that the inflation means reached the predetermined temperature.

Figure 3A:
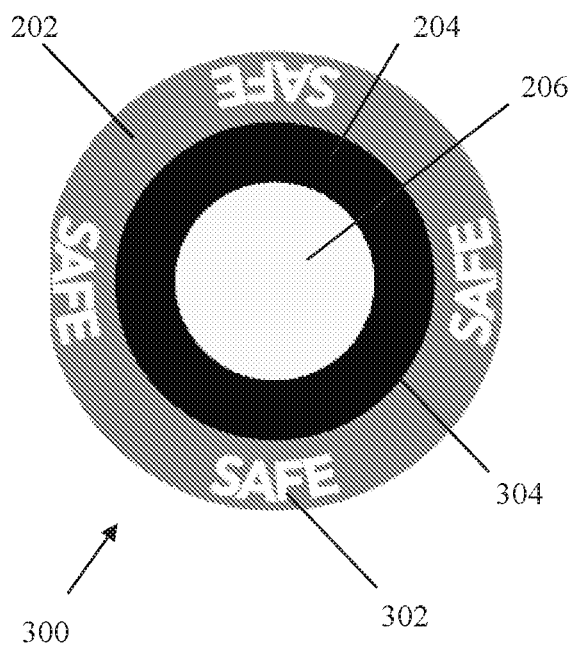
FIGS. 3A, 3B, 3C and 3D are enlarged views showing alternative stages of visible indication of temperature changes.
Figure 3B:
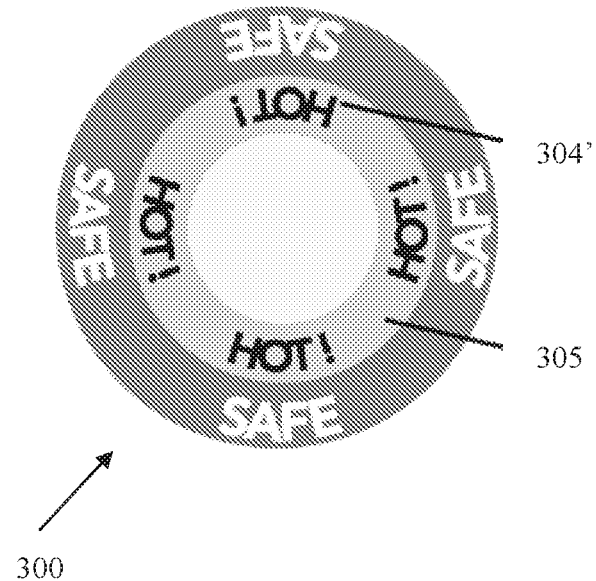
Figure 3C:
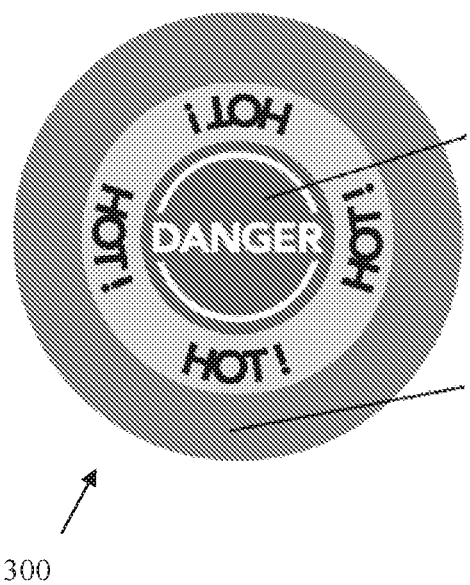
Figure 3D:
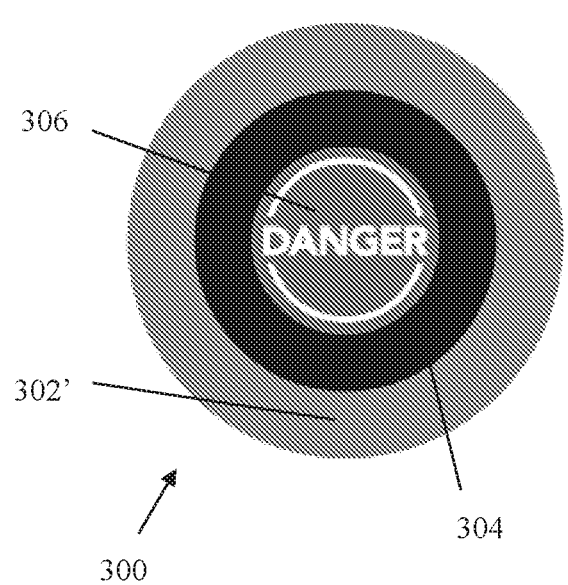

Referring to FIG. 3A an alternative indicia 300 is shown. The indicia 300 has three zones, which in this embodiment are concentric circles, namely an outer circle 202, an middle circle 204 and an inner circle 206. Each of the zones has a visual temperature sensitive material, each may be sensitive to a different temperature as described below. In FIG. 300 the indicia is at a lower first temperature that is below a first temperature threshold. In FIG. 3B the indicial 300 in now at a second temperature, that is above the first temperature threshold, but below a second temperature threshold. In FIG. 3C the indicial 300 in now at a third temperature that is above the second temperature threshold. In FIG. 3D the indicial 300 in now at a fourth temperature that is below the first temperature threshold, but was at a temperature above the second temperature threshold.

In an example the first temperature threshold is 50 degrees C., and the second temperature threshold is 70 degrees C. It will be appreciated that other values can be used.

Returning to FIG. 3A the first temperature sensitive material of the first zone 202 is in the form of lettering 302, which in this embodiment make the word "SAFE". The first zone has a first background colour, in this embodiment green. The colour of the lettering 202 when below the second temperature is a different colour to the first background colour, which in this case is white. The colour of the lettering 202 when above the second temperature is substantially the same colour to the first background colour, which in this case is green. Thus in FIG. 3A the lettering 302 is visible. In practice the first material is an annulus and the "background" is printed over the material in a manner that is a negative of the lettering as this is easier to manufacture than forming the material in the shape of letters, although this is possible. In an alternative the first material is clear in this state, with the background and lettering printed underneath, but when the colour change occurs, as is the case in FIG. 3C, the colour is an opaque green, that is substantially the same as the green of the background.

The second temperature sensitive material of the second zone 204 is in the form of an annulus 304, which covers printing 304' that is underneath. The printing underneath 305, in this embodiment is yellow on which is the word "HOT!" 304'. The colour of the annulus 304 when below the second temperature is an opaque colour, such as black. The colour of the annulus 304 when above the second temperature is substantially transparent, such that the printing 304' underneath is seen. Thus in FIG. 3A the lettering 304 is not visible.

The third temperature sensitive material of the third zone 206 is in the form of a circle that has printing 306' that is underneath. The printing underneath 306', in this embodiment is red on which is the word "DANGER" 306'. The colour of the circle when below the second temperature is an opaque colour, such as white. The colour of the circle 306 when above the second temperature is substantially transparent, such that the printing 306' underneath is seen. Thus in FIG. 3A the lettering 306 is not visible.

Returning to FIG. 3B, as can be seen the temperature has increased, such as to 60 degrees C. This is above the first temperature threshold, but below the second temperature threshold. Accordingly there has been no change to the first temperature sensitive material of the first zone 202. The word SAFE is still visible. The second temperature sensitive material of the second zone 204 is now above its threshold and has thus changed from black to clear. Accordingly the printing underneath 305 is now visible so that the yellow background is now seen as is the word "HOT!" 304'. There is no change to the third temperature sensitive material of the third zone 206.

Returning to FIG. 3C, as can be seen the temperature has increased, such as to 75 degrees C. This is above the first temperature threshold, and the second temperature threshold. Accordingly the first temperature sensitive material of the first zone 202 has changed so that the word SAFE is now blocked out and is no longer visible at 302'. The second temperature sensitive material of the second zone 204 is still above its threshold accordingly the printing underneath 305 is still visible so that the yellow background is now seen as is the word "HOT!" 304'. The third temperature sensitive material of the third zone 206 has changed from white to clear so that the red background and the word DANGER is seen.

The colour change of the second first temperature sensitive material is temporary. Whereas the colour change of the first temperature sensitive material and third temperature sensitive material is permanent.

Thus even if the temperature drops below 70 degrees C. there will not be any change to those having permanent changes. The temporary change will revert when the temperature drops below the first temperature threshold. Accordingly the word SAFE remains blocked and the word DANGER remains once the second threshold is reached even if the temperature drops.

Returning to FIG. 3D, as can be seen the temperature has decreased below the first temperature threshold, such as to 45 degrees C. The second temperature sensitive material of the second zone 204 is now below its threshold accordingly the printing underneath 305 is blocked out so that the yellow background and word "HOT!" 304' is now blocked out. The change to the third temperature is permanent so the red background and the word DANGER remain.

The indicia 300 can be applied to the plug 10 or directly to the canister 22 or another temperature sensitive pressurised vessel, dangerous goods or packaging thereof to indicate whether the vessel is no longer safe due to exposure to excessive temperature. In particular the indicia 300 may be in the form of an adhesive backed sticker.

The sticker could be applied to packaging of explosives or flammable goods or the containers/vessels holding them and is not limited to use on the plugs given in the examples above.

Modifications may be made to the present invention with the context of that described and shown in the drawings. Such modifications are intended to form part of the invention described in this specification.

One such modification is to select the temperature thresholds so that the indicia provides a warning when exposed to extreme cold temperatures, for example if a vessel may become weaken in extreme cold conditions.

The invention claimed is:

1. An indicator for attachment to an item so as to indicate current safety of the item and a permanent change to the safety of the item, said indicator comprising: a first temperature sensitive indicia and a second temperature sensitive indicia;
   wherein the second temperature sensitive indicia provides an irreversible visible indication when the item to which the indicator is attached has reached a second predetermined temperature, different to a first predetermined temperature, so as to indicate that the item is permanently unsafe even if the item returns past the second predetermined temperature, wherein the second predetermined temperature is selected to be a temperature at which the item begins to be rendered permanently unsafe due to being exposed to a temperature of at least the second predetermined temperature;
   wherein the first temperature sensitive indicia provides a reversible visible indication when the item reaches the first predetermined temperature so as to indicate that the item is currently temporarily unsafe and will indicate that the item is currently safe again when the temperature returns past the first predetermined temperature;
   wherein the indicator is attached to the item and item comprises an inflatable borehole plug with a pressurised canister inside.

2. An indicator according to claim 1, wherein the first predetermined temperature is lower than the second predetermined temperature and the second predetermined temperature is such that exposure of the item to heat of at least the second predetermined temperature renders the item permanently unsafe.

3. An indicator according to claim 1, wherein the first predetermined temperature is more than the second predetermined temperature and the second predetermined temperature is such that exposure of the item to cold of at least the second predetermined temperature renders the item permanently unsafe.

4. An indicator according to claim 1, wherein the first temperature sensitive indicia is a thermochromic ink.

5. An indicator according to claim 1, wherein the second temperature sensitive indicia is a thermochromic ink.

6. An indicator according to claim 1, wherein the first predetermined temperature is selected to be a temperature at which touching of the item with bare skin would cause a burn to the skin.

7. An indicator according to claim 1, wherein the second predetermined temperature is selected to be a temperature at which the pressurised canister becomes permanently unsafe.

8. An indicator according to claim 1, further comprising a third temperature sensitive indicia arranged so as to provide a reversible visible indication when the item reaches the second predetermined temperature.

9. An indicator according to claim 1, wherein the second temperature sensitive indicia comprises a change inhibitor, wherein the irreversible visible indication only occurs if the item has been at the second predetermined temperature for a first period of time.

10. An indicator according to claim 1, wherein the first temperature sensitive indicia comprises a change inhibitor, wherein the reversible visible indication only occurs if the item has been at the first predetermined temperature for a second period of time.

11. A method of indicating when a dangerous item is currently at a safe temperature and when the item is permanently unsafe due to extreme temperature exposure comprising:
   providing a first temperature sensitive indicia on the item or packaging of the item comprising an inflatable borehole plug with a pressurised canister inside, wherein the first temperature sensitive indicia is arranged to provide a first visible indication when the item is below a first predetermined temperature and a reversible second visible indication when the item reaches the first predetermined temperature, wherein the first predetermined temperature is selected to be a temperature at which the pressurised canister begins to be temporarily unsafe;
   providing a second temperature sensitive indicia on the item, wherein the second temperature sensitive indicia is arranged to provide an irreversible third visible indication when the pressurised canister reaches a second predetermined temperature, wherein the second predetermined temperature is selected to be a temperature at which the pressurised canister begins to be permanently unsafe due to being exposed to a temperature of at least the second predetermined temperature;
   where the first visual indication indicates that the item is safe;
   where the second visual indication indicates that the item is not safe, but will be safe when the first visual indication is indicated when the temperature returns past the first predetermined temperature; and
   where the third visual indication indicates that the item is unsafe and will not be safe even if the temperature is below the second predetermined temperature.

12. A method according to claim 11, wherein the second temperature is above the first temperature, and the item becomes permanently unsafe when exposed to a temperature above the second temperature.

13. An indicator according to claim 1, wherein the second temperature sensitive indicia is arranged over the first temperature sensitive indicator, wherein before the second temperature sensitive indicator has reached the second predetermined temperature it does not obscure the first temperature sensitive indicia, wherein when the second temperature sensitive indicia changes to indicate that the item is permanently unsafe it obscures the first temperature sensitive indicator.

* * * * *